United States Patent [19]

Nay

[11] Patent Number: 4,897,784

[45] Date of Patent: Jan. 30, 1990

[54] MULTI-LEVEL BUS ACCESS FOR MULTIPLE CENTRAL PROCESSING UNIT

[76] Inventor: Daniel L. Nay, 30147 Via Borica Ave., Rancho Palos Verdes, Calif. 90274

[21] Appl. No.: 743,299

[22] Filed: Jun. 10, 1985

[51] Int. Cl.[4] .......................... G06F 9/00; G06F 13/00
[52] U.S. Cl. ................................. 364/200; 364/240.2; 364/229; 364/229.2; 364/229.4
[58] Field of Search ................. 364/200 MS, 900 MS; 340/826, 827; 370/87, 88

[56] References Cited

U.S. PATENT DOCUMENTS

| | | | |
|---|---|---|---|
| 4,368,514 | 1/1983 | Persaud et al. | 364/200 |
| 4,495,567 | 1/1985 | Treen | 364/200 |
| 4,590,556 | 5/1986 | Berger et al. | 364/200 |

Primary Examiner—Gareth D. Shaw
Assistant Examiner—Jonathan C. Fairbanks
Attorney, Agent, or Firm—Keith D. Beecher

[57] ABSTRACT

A system by which a number of central processing units (CPU's) may be used completely independently of one another, and yet by which any CPU within the system may communicate with any other CPU in the system. The implementation of the system requires each CPU to be physically connected only to its own bus and to the bus of one other CPU even if there are many CPU's and buses in the system. This enables each CPU in the system to have access to all of the buses of all of the other CPU's in the system.

4 Claims, 8 Drawing Sheets

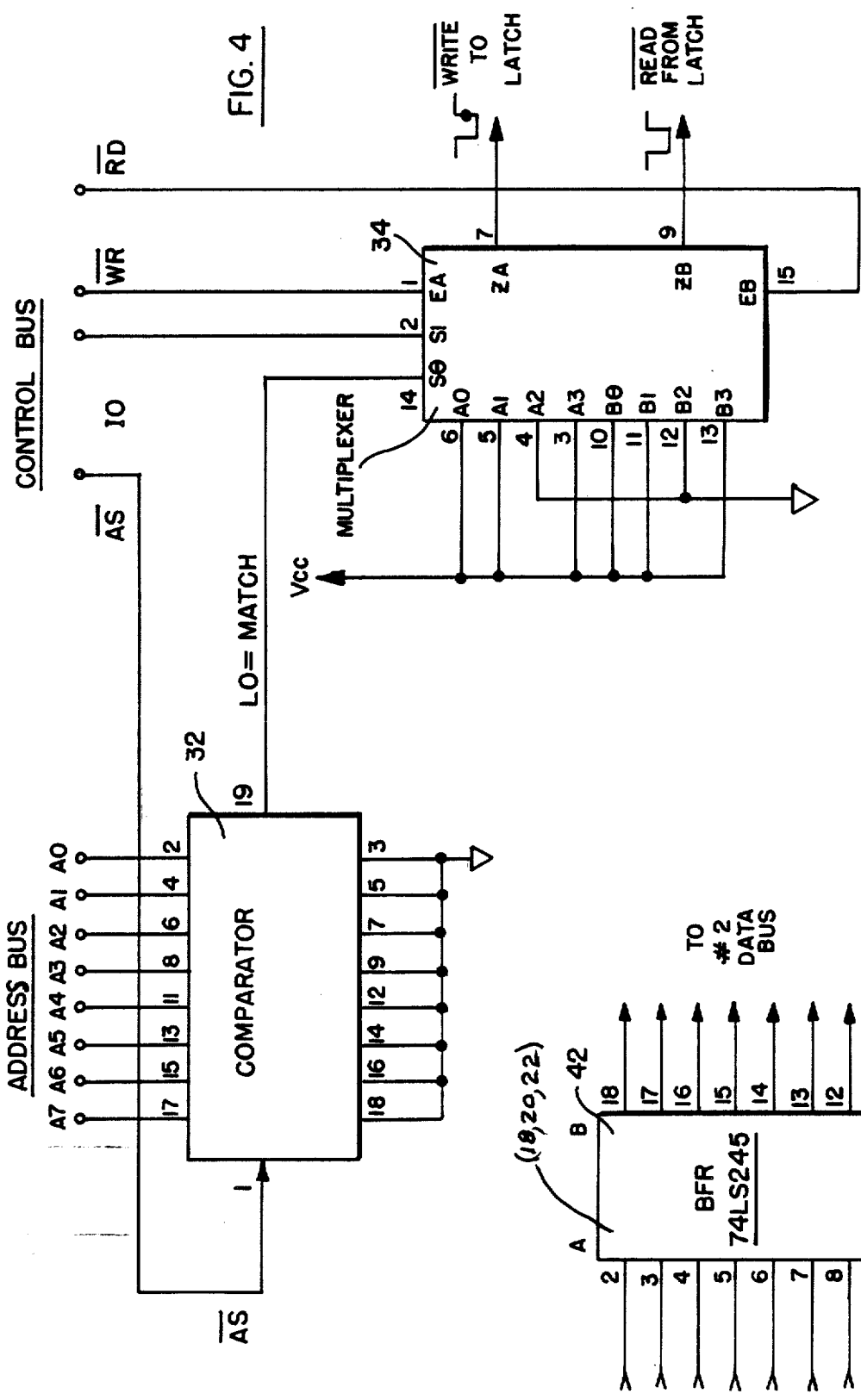

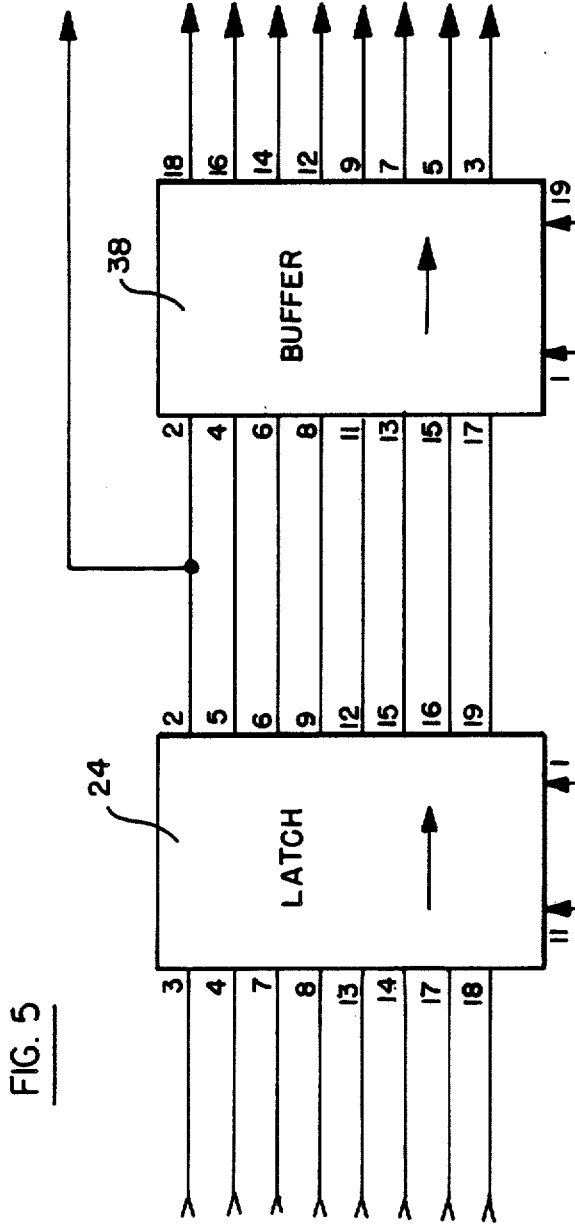

MULTI-LEVEL BUS ACCESS FOR MULTIPLE CENTRAL PROCESSING UNIT

BACKGROUND OF THE INVENTION

A feature of the system of the invention is that each CPU in the system is capable of accessing two buses, one directly and the other indirectly. Then, by virtue of a "reach-through" operation, each CPU is capable of accessing any other bus within the system. For most operations, each CPU operates independently and autonomously in the system. However, when required, any CPU can communicate with any other CPU within the system in a rapid and efficient manner.

The prior art communication systems from one CPU to another do not usually involve the temporary takeover of the bus of one CPU by another CPU. Instead, one CPU derives data from its memory and places the data in a communication channel, and a second CPU takes the data from the communication channel and places it in its memory. This involves the overhead of two operating CPU's, and additional overhead involving handshaking and status passing operations.

In the system of the present invention, on the other hand, only one operating CPU is involved during the communication phase, and that CPU is capable of withdrawing data from the memory of another CPU and of storing the data in its own memory by taking over the bus of the other CPU.

For example, the situation may be considered in which a first CPU is required to transfer data to a second CPU. With the bus takeover feature of the system of the present invention, a master CPU is caused to take over a sub-system CPU, rendering the sub-system CPU inactive, and setting up a data transfer from the memory of the sub-system CPU to the memory of the master CPU. The master CPU may proceed with other operations while the transfer is taking place. After the transfer has been completed, the master CPU releases the sub-system CPU allowing it again to operate independently of the master CPU. The total elapsed time of the takeover of the sub-system CPU, the transfer of data, and the release of the sub-system CPU, is less than that required in the prior art systems by a factor of 2:10, or more.

The bus takeover system of the invention may be used, for example, as a general purpose computer system composed of several CPU sub-systems. One master CPU sub-system assigns tasks to each of the other CPU sub-systems. Each CPU sub-system may be of the general purpose type, and they may all be identical; or each CPU sub-system may be specialized. For example, one CPU sub-system may be in charge of printers and terminals, and another CPU subsystem may be in charge of mass storage, and so on.

In the system describe in the preceding paragraph, the master CPU sub-system takes over the bus of another CPU sub-system only long enough to transfer data between the sub-systems, either to initialize a task, or to withdraw the results. At all other times each CPU sub-system operates independently of all others.

Another field of use for the bus takeover system of the invention is in conjunction with disk-drive test equipment of the type in which many CPU sub-systems are involved in testing different groups of disk drives. In such a system, the master CPU sub-system takes care of operator communication and supervision of the various CPU sub-systems. Each CPU sub-system is independent of all other sub-systems during its test sequences. However, when the master is conditioned to redirect the sequence, or to withdraw test result data, the master takes over each sub-system only long enough to transfer data to or from the particular sub-system.

BRIEF DESCRIPTION OF THE DRAWINGS

FIG. 4 is a logic diagram of certain control and address decode units included in the sub-system of FIG. 3;

FIG. 5 is a diagram showing a latch and a buffer integrated circuit by which one CPU sub-system in the system of FIG. 1 is able to send messages to the other CPU sub-system, and also to take over the other CPU sub-system;

FIG. 5A is a representation of a simpler latch integrated circuit for performing the function of the circuits of FIG. 5;

FIG. 6 is a representation of a bi-directional buffer required for data bus connection in the system of FIG. 3;

DETAILED DESCRIPTION OF THE ILLUSTRATED EMBODIMENT

Figure 1:
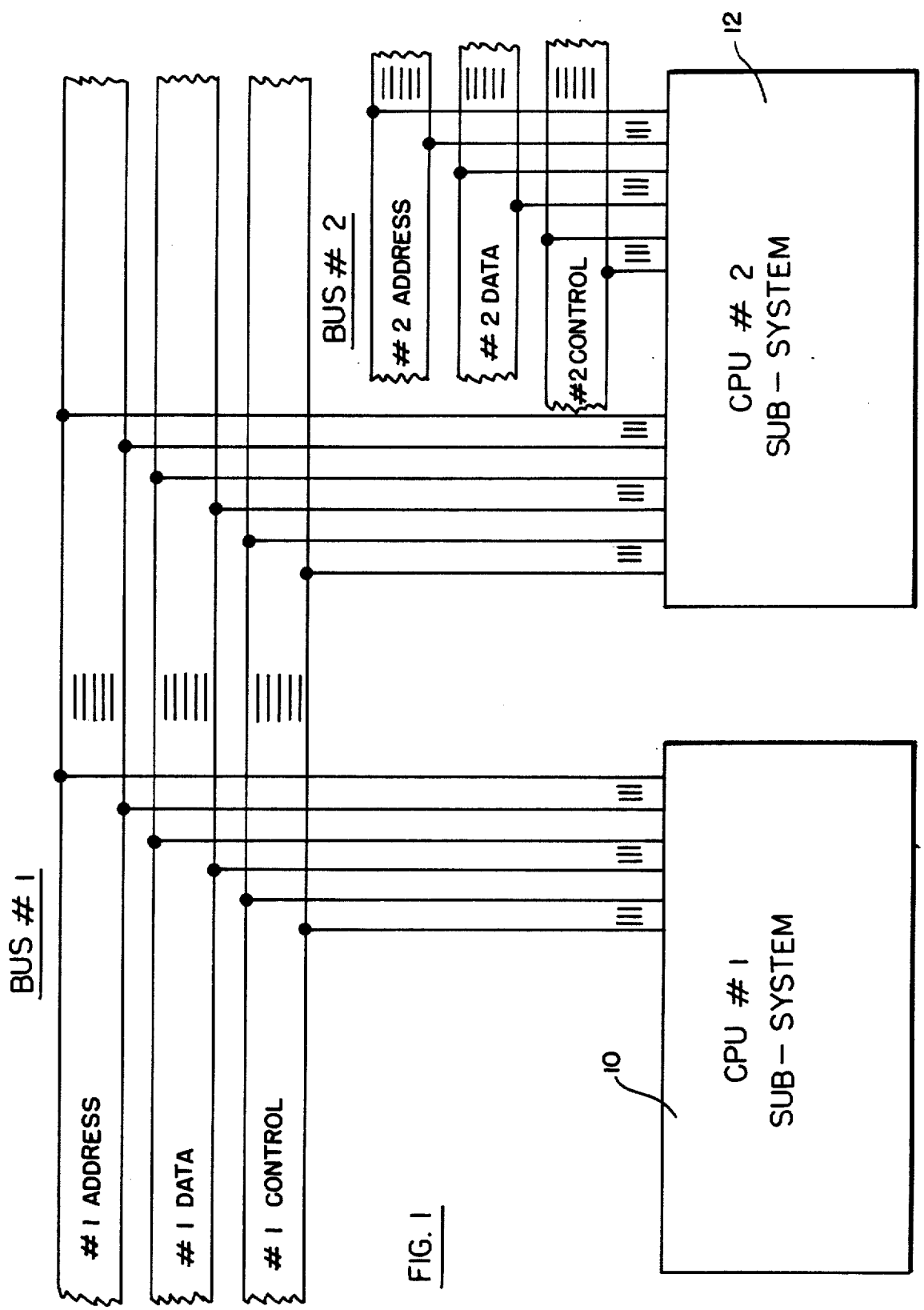
FIG. 1 is a block diagram of two CPU sub-systems connected to two address, data and control buses.

The system of FIG. 1 includes two CPU sub-systems designated CPU #1 and CPU #2, the sub-systems being respectively represented by blocks 10 and 12. The CPU #1 is connected to the control lines, data lines and address lines of a bus designated bus #1, and normally CPU #1 controls and uses the address, data and control lines of bus #1. CPU #2, on the other hand, is connected to the address, data and control lines of a bus #2, and normally CPU #2 controls and uses the address, data and control lines of bus #2.

However, CPU #1 can request access from CPU #2, and can then proceed to de-activate CPU #2, and then to take over and use the control, data and address lines of bus #2.

Figure 2:
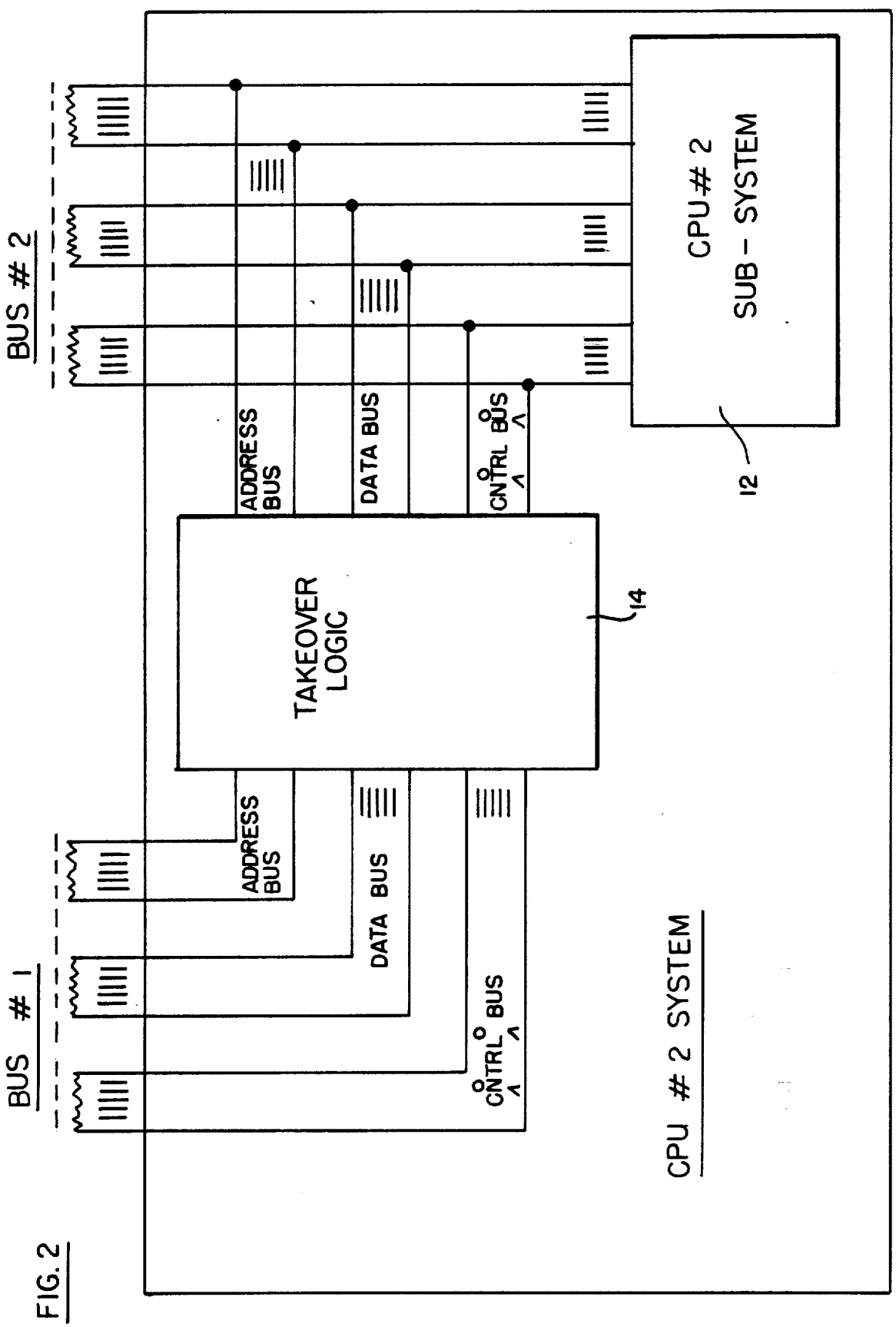
FIG. 2 is a block diagram illustrating the details of one of the CPU sub-systems of FIG. 1 in greater detail, and including a takeover logic unit for connecting the illustrated CPU sub-system to the bus of the other CPU sub-system of FIG. 1.

Details of the CPU #2 sub-system are shown in FIG. 2, and again the CPU #2, including its memory and peripherals are represented by block 12. By reference to FIG. 2, it may be seen that CPU #2 is not directly connected to bus #1. Instead, a takeover logic circuit unit represented by block 14 separates bus #2 from bus #1. CPU #2 has total access to bus #2, however, except when it is rendered inactive by CPU #1.

Figure 3:
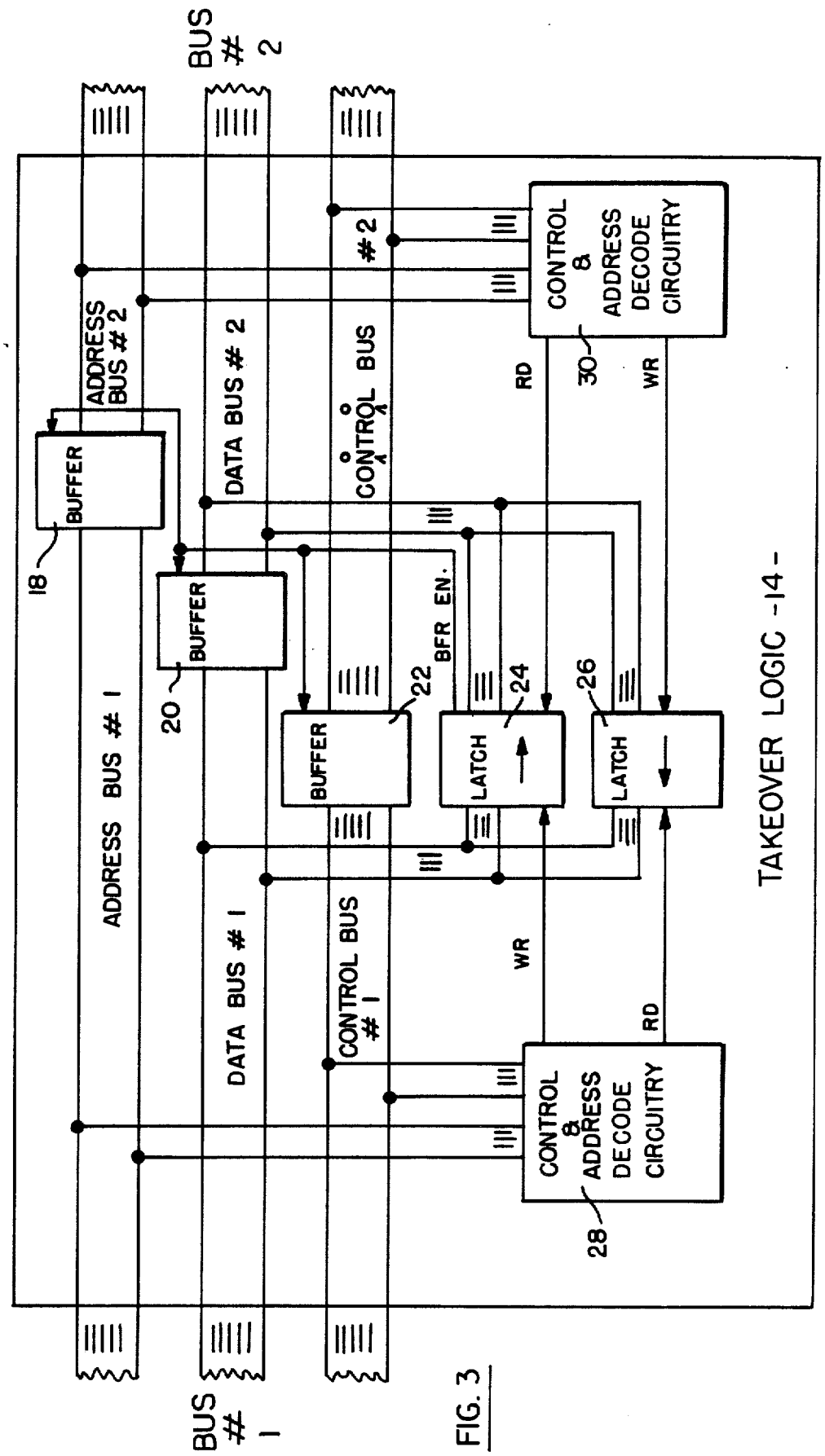
FIG. 3 shows details of the takeover logic unit of FIG. 2.

Details of the takeover logic circuit 14 are shown in the logic diagram of FIG. 3. As shown in FIG. 3, the takeover logic circuit includes three buffers 18, 20 and 22 which respectively connect the address lines, data lines and control lines of buses #1 and #2. When the buffers are disabled, the buses are isolated from one another. However, when the buffers are enabled, then bus #2 essentially becomes part of bus #1.

Two latches designated 24 and 26 are also included in the takeover logic unit 14, and these latches permit CPU #1 to write into latch 24 and read from latch 26. Conversely, CPU #2 reads from latch 24 and writes into latch 26. Therefore, even though the buses #1 and #2 are isolated from one another, each CPU can send messages to the other. In addition the latch 24 also outputs a control signal to enable the buffers and to de-activate CPU #2.

The takeover logic circuit 14 also includes control and address decode circuitry represented by blocks 28 and 30. The circuits included in the two blocks are identical, providing output control signals to the latches.

FIG. 4 is a diagram showing the circuit details of the control and address decode circuitry of blocks 28 and 30 of FIG. 3. The part of the address bus which selects input/output addresses is compared against a fixed address in a comparator 32, which may be of the type designated 74LS688. When a match occurs, the comparator output at pin 19 goes low. The decode circuitry also includes a multiplexer 34 which may be of the type designated 74LS153. The multiplexer 34 outputs either a "write" to one latch to cause new data to be latched, or else it outputs a "read" to the other latch to enable its outputs to flow to the data bus. The multiplexer inputs are arranged to cause the appropriate outputs to occur when the specific input/output addresses and control signals are correct.

FIG. 5 shows the latch details of the circuit which CPU #1 uses to send messages to CPU #2, and over CPU #2. The circuit includes latch 24 which may be of the type designated 74LS374 and a buffer 38 which may be of the type designated 74LS244, the outputs of the buffer being introduced to the data lines of bus #2. The buffer 38 is necessary because the control outputs of latch 24 must always be defined, but cannot be directly connected to the data lines of the #2 bus.

With respect to latch 26, and as shown in FIG. 5A, no buffer is required for enabling CPU #2 to send status signals and messages to CPU #1.

FIG. 6 shows the details of a buffer, 42, which represents any one of the buffers 18, 20 or 22 of FIG. 3. Buffer 42 may be of the type designated 74LS245.

Figure 7:
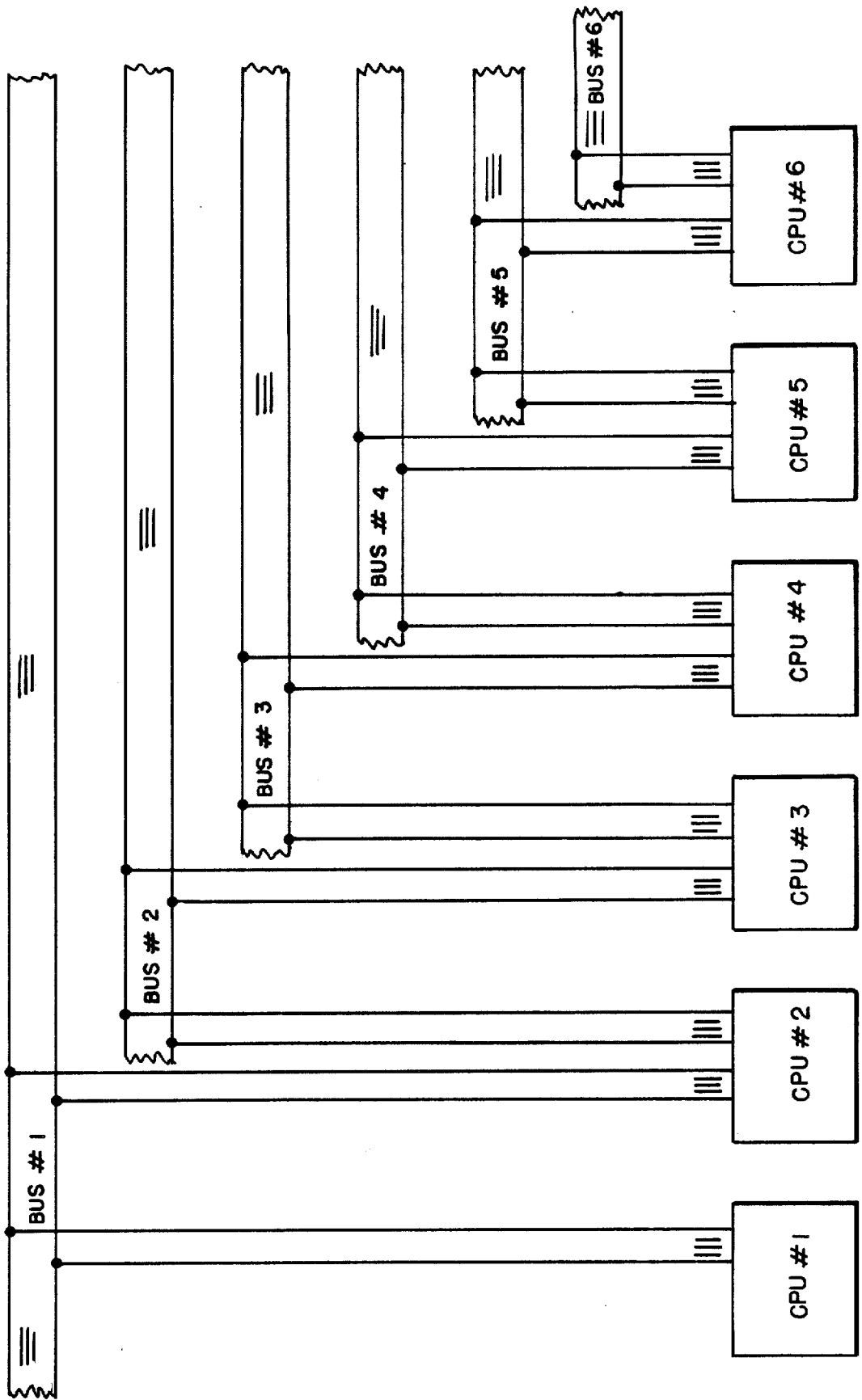
FIG. 7 is a block diagram of six uniform CPU sub-systems, each consisting of one CPU and one bus, with each sub-system being connected to a next higher sub-system, so that upward takeover may be achieved.

In the system of FIG. 7, six CPU sub-systems designated CPU #1–CPU #6 are connected to corresponding buses designated bus #1–bus #6. In addition, each CPU is connected to the next higher numbered CPU, so that upward takeover may be carried out.

Figure 8:
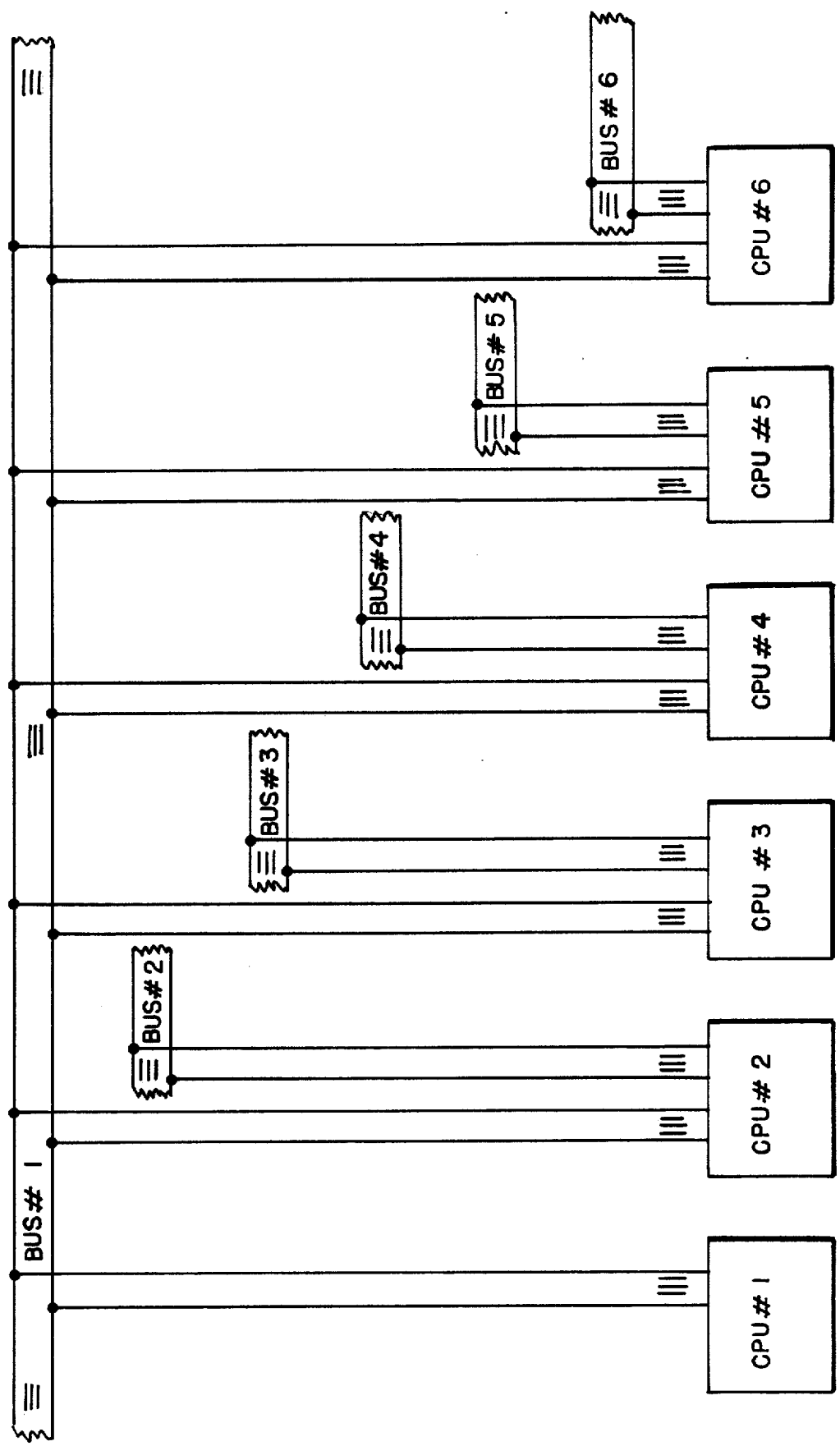
FIG. 8 is a block diagram of six CPU sub-systems connected so that a particular CPU may directly take over any of the other CPU's.

In the system of FIG. 8, six CPU's designated CPU #1–CPU #6 are shown as connected to respective buses bus #1–bus #6. However, each of the CPU's #2–#6 are also connected to bus #1, so that CPU #1 can take over any of the other CPU's directly.

Figure 9:
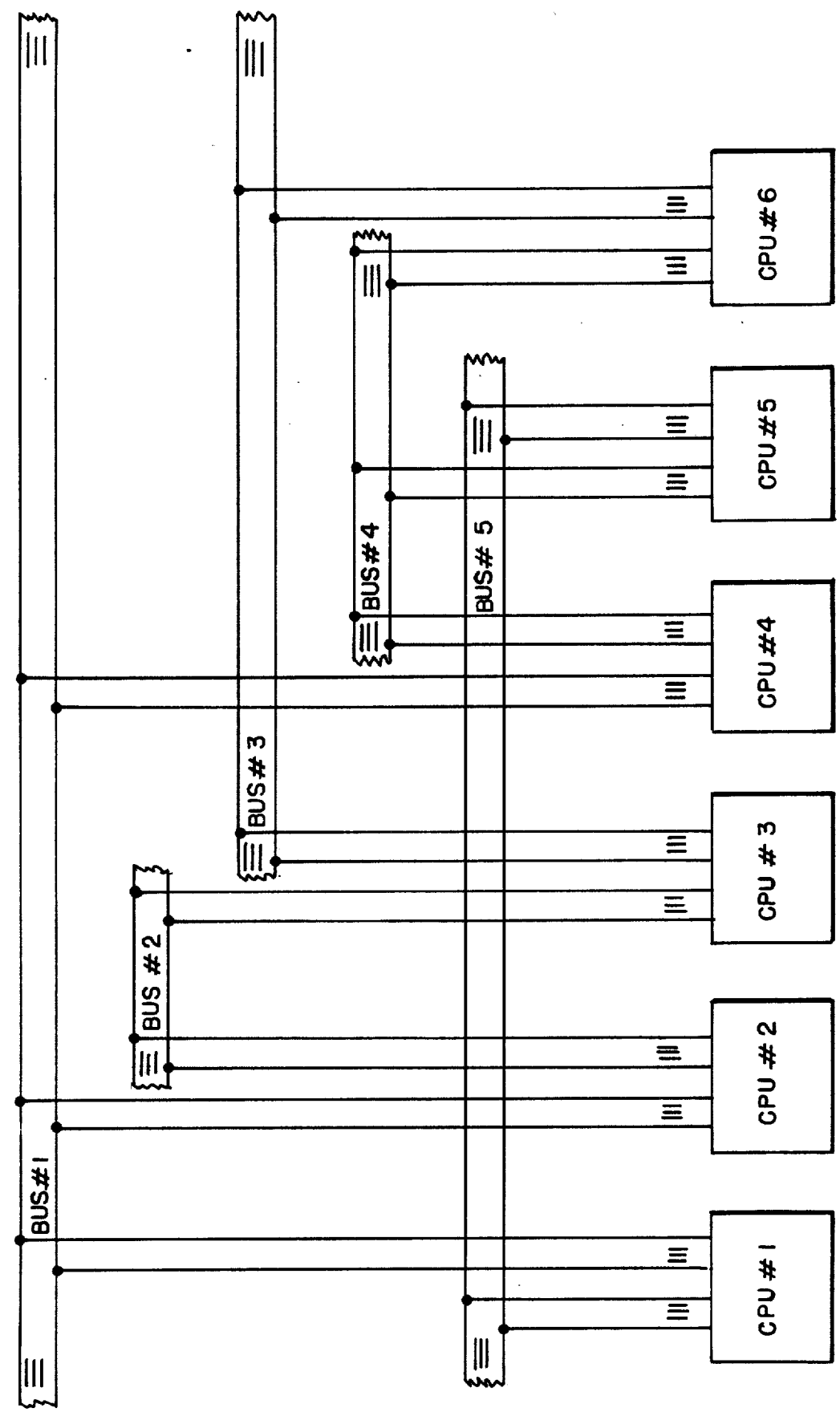
FIG. 9 is a block diagram of six CPU sub-systems, in which there is a random interconnection of buses with forward takeover possibilities.

In the system of FIG. 9, the CPU's #1–#6 are connected in a random manner to buses #1–#5, which provide the following forward takeover possiblities: #1 to #2, #1 to #4, #2 to #3, #4 to #5, #4 to #6, #5 to #1. It should be noted that CPU #3 and CPU #6 share bus #3, so that if, for instance, CPU #2 were to take over CPU #3, it would only be able to time share bus #3 with CPU #6.

The system of the invention involves, accordingly, N separate and distinct CPU's, and N separate buses, with each CPU being in control of one bus. Thus, there are N isolated sub-systems, with each sub-system consisting of a CPU in charge of one bus. The CPU may have any desired associated memory or peripherals connected to it, and the bus consists of address, data and control lines. One such CPU may be considered to be CPU #1 connected to bus #1.

The system also includes a CPU #2 which is connected to bus #2, and a set of bi-directional buffers, latches and control circuitry, which allow CPU #1 to be connected to bus #2, if both CPU #1 and CPU #2 agree to the connection, This control, when in effect, puts CPU #2 into a "hold state" whereby it tri-states its outputs and releases all control over bus #2 and is essentially inactive.

CPU #1 now has total access to bus #2, in addition to its normal access to bus #1. Accordingly, everything on bus which could be accessed by CPU #2 is now under the control of CPU #1. Takeover of bus #2 by CPU #1 is initiated by a simple input/output write from CPU #1 to a latch which can be read by CPU #2. When CPU #2 makes an appropriate response, CPU #1 completes the takeover, rendering CPU #2 inactive.

Similar circuitry may be incorporated into the system between CPU #2 and bus #3 to which CPU #3 is connected, thereby permitting CPU #2 to render CPU #3 inactive and to take over bus #3. With the connections between bus #1 and bus #2 described above, and now between bus #2 and bus #3, it is obvious that CPU #1 can render CPU #2 inactive, and then "reach through", and render CPU #3 inactive and thus take over buses #1, #2 and #3. Furthermore, if similar circuitry is added between each CPU #K and bus #K+1, then any CPU #K can render CPU #K+1 inactive and take over bus,#K+1. Finally, given the above sequential connections from one bus to the next, it is evident that any CPU can take over all of the higher numbered buses beyond it, so that in the extreme, CPU #1 can control buses #1, #2, #3, #4, #5 ... N.

When no takeovers are in effect, then the N CPU's operate separately and independently controlling only their own bus structure.

There are further interconnections that may be made such as:

1. Connecting CPU #N to bus #1 to complete a ring, thus allowing any CPU ultimate access to any bus.

2. Providing more than one connection from a specific CPU to several buses. For instance, allowing CPU #1 directly to take over buses #1, #2, #3, #4, #5 or #6 without going through any other buses.

The ultimate system is one in which every CPU is capable of taking over any bus, without going through any other buses. A further system may be provided which permits takeover in either direction, so that CPU #1 can take over CPU #2, and also CPU #2 can take over CPU #1, and so on.

Accordingly, although particular embodiments of the invention have been shown and described, modifications may be made, and it is intended in the following claims to cover all modifications which come within the true spirit and scope of the invention.

I claim:

1. A data processing system comprising a plurality of sub-system each capable of operating independently of one another; each of said sub-systems including a CPU and a general purpose bus consisting of address, data and control lines, connected thereto and controlled thereby; a takeover logic circuit for allowing one of said sub-systems to take over the bus of another of said sub-systems; said takeover logic circuit including a plurality of bi-directional buffers for interconnecting the respective lines of the buses of the two sub-systems when said buffers are enabled, and for isolating the buses from one another when said buffers are disabled, a pair of latches connected to the data lines of the two buses, one of said latches receiving data from one of the CPU's and for sending the data to the other CPU, and the other of said latches receiving data from the other of said CPU's and for sending data to said one of said CPU's, and one of said latches being connected to said buffers to enable said buffers upon the receipt of selected signals from at least one of said CPU's; and a separate takeover logic circuit associated with each of said sub-systems to permit any one of said sub-systems to take over the bus of another of said sub-systems, and to reach through the other sub-system and take over the buses of subsequent ones of said sub-systems.

2. The data processing system defined in claim 1, and which includes first control circuitry connected to the address lines of the first-named bus and responsive to a selected address signal from said first-named CPU to set one of said latches to a write mode and to set the other of said latches to a read mode, and second control circuitry connected to the address lines of the second-named bus and responsive to a selected address signal from the second-named CPU to set one of said latches to a write mode and to set the other of said latches to a read mode.

3. The data processing system defined in claim 2, in which at least one of said latches introduces a control signal to said buffers to enable said buffers in response to a selected address signal from said first-named CPU.

4. The data processing system defined in claim 2, in which at least one of said latches introduces a control signal to said buffers to enable said buffers in response to selected address signals from the first-named and second-named CPU's.

* * * * *